United States Patent [19]
Atkinson et al.

[11] Patent Number: 5,374,991
[45] Date of Patent: Dec. 20, 1994

[54] COMPACT DISTANCE MEASURING INTERFEROMETER

[75] Inventors: Leland G. Atkinson, Rochester; Kevin J. Vent, Clifton Springs; Jeffrey P. Wong, Rochester, all of N.Y.

[73] Assignee: Gradient Lens Corporation, Rochester, N.Y.

[21] Appl. No.: 676,806

[22] Filed: Mar. 29, 1991

[51] Int. Cl.⁵ .............................................. G01B 11/02
[52] U.S. Cl. ..................................... 356/358; 356/356; 356/351
[58] Field of Search ....................... 356/351, 358, 356

[56] References Cited

U.S. PATENT DOCUMENTS

| | | | |
|---|---|---|---|
| 3,900,259 | 8/1974 | Mott et al. | 356/5 |
| 4,113,381 | 9/1978 | Epstein | 356/5 |
| 4,141,038 | 2/1979 | Gecewicz et al. | 358/107 |
| 4,169,980 | 10/1979 | Zanoni | 250/550 |
| 4,453,825 | 6/1984 | Buck et al. | 356/5 |
| 4,509,858 | 4/1985 | Smythe et al. | 356/358 |
| 4,606,638 | 8/1986 | Sommargren | 356/351 |
| 4,647,206 | 3/1987 | Kunzmann et al. | 356/358 |
| 4,681,447 | 7/1987 | Davidson | 356/351 |
| 4,687,958 | 8/1987 | Sommargren | 307/425 |
| 4,688,940 | 8/1987 | Sommargren et al. | 356/349 |
| 4,702,603 | 10/1987 | Augustyn | 356/351 |
| 4,707,129 | 11/1987 | Hashimoto et al. | |

OTHER PUBLICATIONS

M. Francon: Optical Interferometry, Academic Press, 1966 pp. 137–161.

Primary Examiner—Samuel A. Turner
Assistant Examiner—LaCharles P. Keesee
Attorney, Agent, or Firm—Cumpston & Shaw

[57] ABSTRACT

An interferometer is provided which includes a source for generating a source beam of linearly polarized coherent light along a light path; a non-polarizing beam splitting, combining and resplitter disposed in the path of the source beam for splitting the source beam into a reference beam and a measuring beam and for recombining the reference and measuring beams into an interfering beam and resplitting the interfering beam into a first output beam and a second output beam; a reference reflector positioned in the reference beam for causing the reference beam to traverse a reference path and return to the non-polarizing beam splitting means; a measuring reflector spaced a distance to be measured from the non-polarizing beam splitter for causing the measuring beam to traverse a measured path and return to the non-polarizing beam splitter; a half wave plate in one of the reference and measuring beams for rotating the polarization of the measuring beam relative to the reference beam prior to recombining the measurement and reference beams in the non-polarizing beam splitter; a first polarizing beam splitter positioned in the first output beam for selecting like polarized components of the first output beam; a quarter wave plate in the second output beam for lengthening the optical path traversed by one polarization of the second output beam relative to the other polarization; a second polarizing beam splitter in the second output beam following the delay means for selecting like polarized components of the second output beam; and first and second detectors coupled to the first and second polarizing beam splitters respectively which detectors are responsive to the selected like polarized components of the first and second output beams respectively for providing first and second output signals proportional to the amplitudes of the combined like polarized components of the first and second output beams for determining changes in the length of the measurement path.

28 Claims, 6 Drawing Sheets

U.S. PATENT DOCUMENTS

| | | | |
|---|---|---|---|
| 4,711,574 | 12/1987 | Baldwin | 356/349 |
| 4,784,489 | 11/1988 | Cutler et al. | 356/349 |
| 4,784,490 | 11/1988 | Wayne | 356/351 |
| 4,786,176 | 11/1988 | Froome | 356/373 |
| 4,859,066 | 8/1989 | Sommargren | 356/349 |
| 4,886,365 | 12/1989 | Ulbers | 356/351 |
| 4,973,153 | 11/1990 | Yokokura et al. | 356/358 |
| 4,984,898 | 1/1991 | Höfler et al. | 356/358 |
| 5,064,289 | 11/1991 | Bockman | 356/358 |
| 5,066,130 | 10/1991 | Tsukiji et al. | 356/356 |

OTHER PUBLICATIONS

M. J. Downs & K. W. Raine: An Unmodulated Bidirectional Fringe Counting Counting Interferometer for Measuring Displacement; Precisio Engineering 1, 85–88, 1979.

R. Smythe & R. Moore: Instantaneous Phase Measurint Interferometry, Optical Engineering, 23, 361–364, 1984.

S. Crosdale & R. Palum: Wavelength Control of a Diode Laser for Distance Measuring Interferometry SPIE 1219, 4900503, 1990.

Distance Measurement by the Wavelength Shift of Laser Diode Light–Kikuta et al, Applied Optics, vol. 25, No. 17, Sep. 1986.

*Diode Laser Direct Modulation Heterodyne Interferometer* Tatsuno et al., Applied Optics, vol. 26, No. 1, Jan. 1987.

*Interferometric Investigation of a Diode Laser Source*--Creath, Applied Optics, vol. 24, No. 9, May 1985.

*Ray Tracing, etc.*–Haschberger.

COMPACT DISTANCE MEASURING INTERFEROMETER

This invention relates generally to light wave interferometers and more particularly to a compact distance measuring interferometer having a physically rugged compact optical system employing polarization shifting techniques for providing an interferometer that can be driven by a solid state laser diode.

Distance measuring interferometers are used in a variety of applications, including controlling machine tools, measuring the displacement of objects and the like. Heretofore, distance measuring interferometers have commonly employed helium neon lasers as light sources. Helium neon lasers are bulky and expensive. Helium neon lasers have the advantages of relatively long coherence length, and the ability to use polarization splitting or Zeeman splitting techniques to be wavelength stabilized, so that distance measuring interferometers using helium-neon lasers as sources can be used to measure relatively large changes in distance over relatively long distances.

Among the commercial distance measuring interferometers presently available are those manufactured by Opdodyne, which cost in excess of $10,000, and those manufactured for example by Hewlett-Packard and Zygo, which cost in excess of $15,000.

In very general terms, distance measuring interferometers split a light source beam into a reference beam and a measurement beam, direct the reference beam over a path of known length, direct the measurement beam over the path to be measured, recombine the beams, and determining the length and/or change in length of the measurement path by means of the interference between the beams. Commonly, helium neon laser distance measuring interferometers use electro-optic modulators or Zeeman splitters for creating measurement and reference beams of different frequencies. After traversing the reference and measurement paths, the beams are combined in a balanced demodulator for measuring changes in the measurement path length.

Although helium neon laser distance measuring interferometers are for the most part effective, they are too large and too expensive for many applications. The principal reason for the size and expense of existing distance measuring interferometers is the helium neon laser source itself. Lower cost more compact laser distance measuring interferometers would have a variety of uses that cannot be served by existing laser distance measuring interferometers. Solid state laser diode sources have the advantage over helium neon lasers that they are compact and much less expensive. However, their characteristics are not as well suited for distance measuring interferometers as helium neon lasers.

Stabilized helium neon lasers may have a coherence length of several meters or more. Currently available laser diode sources have a significantly shorter coherence length. One of the laser diode sources used in the present invention has a coherence length of only 24". Heretofore, it has not been considered possible to make a useable distance measuring interferometer employing a laser diode source.

The distance measuring interferometer of the present invention utilizes the principals of differential polarization interferometry as described by M. Francon in *Optical Interferometry*, Academic Press, 1966, pp. 137–161. More specifically, the optical arrangement of the distance measuring interferometer of the present invention is partly based upon a Michelson interferometer configuration. Similar configurations are shown, for example, by M. J. Downs and K. W. Raine, An *An Unmodulated Bidirectional Fringe Counting Interferometer for Measuring Displacement*, Precision Engineering, 1, 85–88, 1979, by R. Smythe and R. Moore, *Instantaneous Phase Measuring Interferometry*, Optical Engineering, 23, 361–364, 1984, and by S. Crosdale and R. Palum, *Wavelength Control of a Diode Laser for Distance Measuring Interferometry*, SPIE 1219, 490–503, 1990.

Augustyn U.S. Pat. No. 4,702,603 shows an optical phase decoder for interferometers that uses polarization differences to generate three signals used to determine linear motion.

It is an object of the present invention to provide a compact relatively low cost distance measuring interferometer.

It is a further object of this invention to provide a distance measuring interferometer that can employ a laser diode as a light source.

It is still another object of this invention to provide calibration means for a distance measuring interferometer that generates a control signal for stabilizing the wavelength of a laser source, particularly a laser diode source.

Briefly stated, and in accordance with a presently preferred embodiment of this invention, an interferometer is provided which includes source means for generating a source beam of linearly polarized coherent light along a light path;

non-polarizing beam splitting, combining and resplitting means disposed in the path of the source beam for splitting the source beam into a reference beam and a measuring beam and for recombining the reference and measuring beams into an interfering beam and resplitting the interfering beam into a first output beam and a second output beam;

reference reflector means positioned in the reference beam for causing the reference beam to traverse a reference path and return to the non-polarizing beam splitting means;

measuring reflector means spaced a distance to be measured from the non-polarizing beam splitting means for causing the measuring beam to traverse a measured path and return to the non-polarizing beam splitting means;

means in one of the reference and measuring beams for rotating the polarization of the measuring beam relative to the reference beam prior to recombining the measurement and reference beams in the non-polarizing beam splitting means;

first polarizing means positioned in the first output beam for selecting like polarized components of the first output beam;

delay means in the second output beam for lengthening the optical path traversed by one polarization of the second output beam relative to the other polarization;

second polarizing means in the second output beam following the delay means for selecting like polarized components of the second output beam;

electrical circuit means including first and second detectors coupled to the first and second polarizing means respectively which detectors are responsive to the selected like polarized components of the first and second output beams respectively for providing first and second output signals proportional to the amplitudes of the combined like polarized components of the first and second output beams for determining changes in the length of the measurement path.

In accordance with another aspect of this invention, a distance measuring interferometer is provided that includes a laser diode light source characterized by a temperature dependent wavelength, means for splitting a light beam emitted by the laser diode into a reference beam and measurement beam, means for causing the reference beam to traverse a reference path, means for causing the measuring beam to traverse the measuring path, means for changing the relative polarization of the light beam in the reference and measurement paths respectively, means for recombining the reference and measurement beams to provide first and second interference beams, and adjusting means for setting the difference in the optical path lengths of the reference and measuring paths to 0 so that changes in the wavelength of the laser diode source do not affect the position measurements.

In accordance with a still further aspect of this invention, a distance measuring interferometer is provided that includes a laser diode source having a temperature dependent wavelength that may vary during a measurement;
- means for splitting an output beam of the laser diode source into a measurement beam and a reference beam;
- means for directing the reference beam along a reference path of fixed length;
- means for directing the measuring beam along a measuring path of changeable length;
- means for recombining and interfering the measuring beam and the reference beam;
- means responsive to the recombined interfering beam for measuring changes in the length of the measuring path;
- means for directing a calibrating portion of the measuring beam along a calibration path of fixed length;
- means for combining and interfering the calibration portion of the measuring beam with a portion of the reference beam for generating an interfering calibration beam; and
- means for detecting changes in the interfering calibration beam due to changes in the wavelength of the laser diode source for controlling the wavelength of the laser diode source.

While the novel aspects of the invention are set forth with particularity in the appended claims, the invention itself, together with further objects and advantages thereof, may be more readily understood by reference to the following detailed description of a presently preferred embodiment of the invention, taken in conjunction with the accompanying drawing in which:

The distance measuring interferometer of the present invention has been developed and is particularly well suited for applications that require a compact, rugged, non-contact, and low cost precision measurement tool. Such applications include liquid level sensing, disk head drive position tracking, step and repeat stages for semiconductor production, vibration monitoring, and other critical positioning tasks, where total travel is on the order of 12" or less. As will be described in more detail below, the distance measuring interferometer of the present invention provides either TTL compatible up-down pulses or industry standard A/B square wave or sine wave outputs. The up-down pulses correspond to displacements of one-eighth of the wavelength of the laser diode source. For example, where a laser diode source having a wavelength $\lambda=670$ nm is employed, the pulses correspond to 83.75 nm (3.29 micro inches) of travel. The maximum slew rate of the distance measuring interferometer of the present invention is limited by the bandwidth of the detector and the counter electronics. The version described below has a bandwidth of 500 kHz, limiting the maximum slew rate to approximately 3" per second. Electronics with a bandwidth of 30 MHz or greater may be easily implemented to provide maximum slew rates of over 200" per second.

Figure 1:
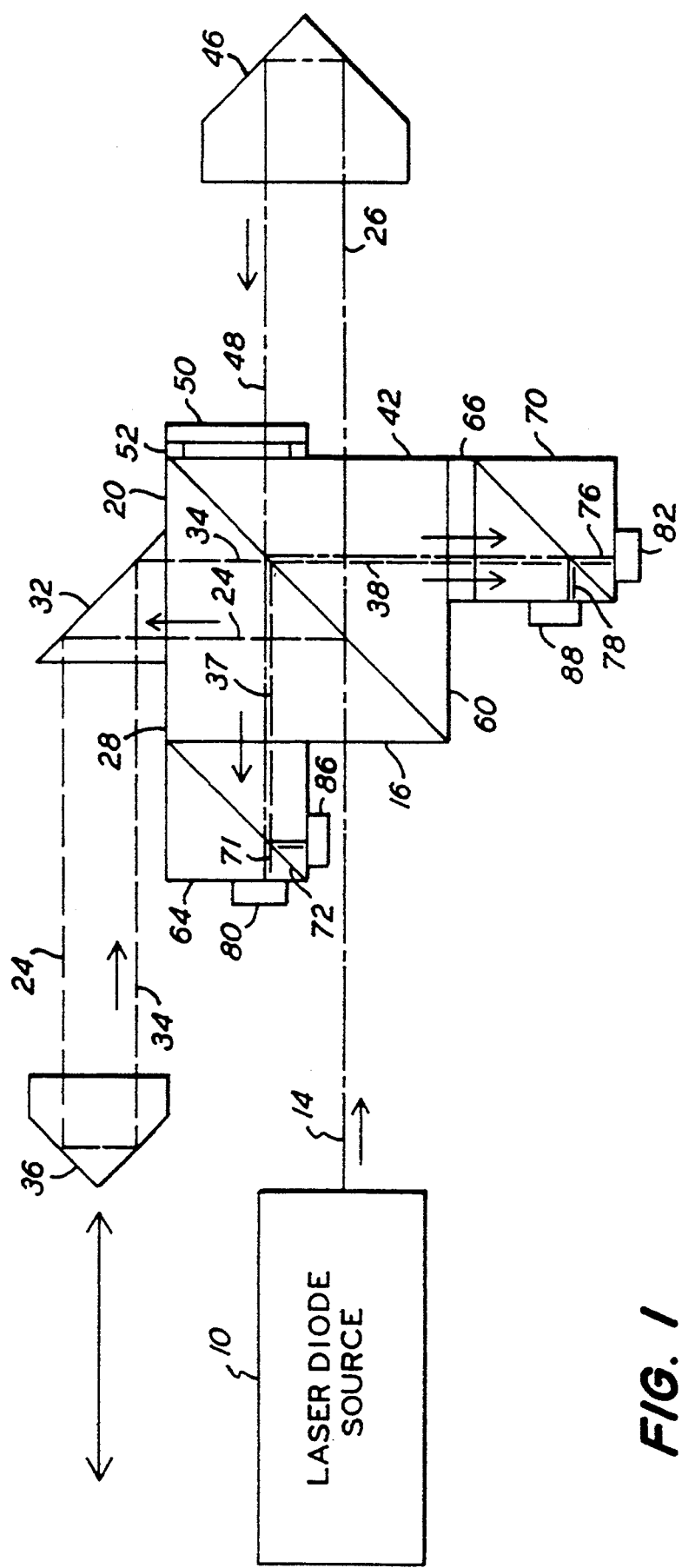
FIG. 1 is a diagrammatic view of a distance measuring interferometer in accordance with this invention.

A diagrammatic view of the optical configuration for the distance measuring interferometer of the present invention is shown in FIG. 1. A laser diode source indicated schematically at 10 provides a coherent source of light collimated into a beam having a generally rectangular cross-section approximately 2 mm×5 mm, and linearly polarized with the E-field vector oscillating perpendicular to the long dimension of the beam. Laser diode sources having outputs with the above characteristics are available, for example, in the LAS-200-670nm-5mw laser diode light source sold by Laser Max, Inc., which uses a Toshiba TOLD 9211 laser diode.

The collimated polarized output beam 14 from the laser diode source enters a first surface 16 of a non-polarizing beam splitter 20, substantially perpendicular to the first face 16. Preferably, the surface is tilted slightly, about 2 degrees to prevent specular reflection from re-entering the laser diode. The laser diode source 10 is oriented so that the long dimension of the generally rectangular output beam strikes the entrance face 16 of the non-polarizing beam splitter 20 at an angle of about 45°. The beam splitter divides the output beam 14 into a reference beam 24, and a measuring beam 26. Approximately 50% of the energy of the output beam 14 is present in each of the reference and measurement beams 24 and 26 respectively. The reference beam 24 exits the non-polarizing beam splitter 20, through a second face 28. A reflector 32 preferably an aluminum coated 45°-45°-90° prism, sometimes referred to as a right angle prism is attached to face 28 for reflecting the reference beam 24 through a 90° angle to a reference corner cube 36, located a fixed distance from the non-polarizing beam splitter so that the reference beam traverses a known path length. The reference beam is reflected by the corner cube 36 parallel to itself and back to reflector 32, offset by a small distance. The returning reference beam 34 is reflected by right angle prism 32 and reenters the non-polarizing beam splitter 20 through face 28. Beam splitter 20 combines the returning reference beam 34 with the returning measuring beam 48 to form an interfering beam and divides the interfering beam into first and second beams 37 and 38 respectively.

The outgoing measurement beam 26 exits the non-polarizing beam splitter 20 through a third face 42. The measurement corner cube 46 reflects the measurement beam parallel to itself back towards the non-polarizing beam splitter offset by a small distance. The returning measuring beam 48 passes through a half wave plate 50, that may be attached to surface 42, but is preferably spaced slightly apart therefrom by a spacer 52 to form an air gap to reduce the effect of any wedge in the half wave plate. The returning measuring beam 48 is combined by the non-polarizing beam splitter 20 with the returning reference beam 34 to form an 10 interfering beam and divided into the first and second interfering output beams 37 and 38 respectively by beam splitter 20. The combined interfering output beams 37 and 38 exit the non-polarizing beam splitter 20 through surfaces 16 and 60 respectively. The first output beam 36 enters a polarizing beam splitter 64, that is attached to face 16 of non-polarizing beam splitter 20, and the second output beam 38 passes through a quarter wave plate 66, that is attached to surface 60, and then into a second polarizing beam splitter 70. While it is presently preferred to attach the half wave plate to the surface 42 of the non-polarizing beam splitter 20 by a spacer ring to create a gap and reduce the effect of any possible wedge in the half wave plate, this is not required for the quarter wave plate, because the output beam 38 that passes through the quarter wave plate has already been combined, while the beam 48 passing through the half way plate 50 has yet to be combined with the returning reference beam 34.

The polarizing beam splitter 64 splits the output beam 37 into P-polarized beam 71 and S-polarized beam 72, while the polarizing beam splitter 70 splits beam 38 into P-polarized beam 76 and S-polarized beam 78. The P-polarized beams 71 and 76 are directed to detectors 80, 82 respectively, while the S-polarized beams 72 and 78 are directed to detectors 86, 88 respectively. Preferably, the detectors 78, 80, 82, 86 are attached to the surfaces of the polarizing beam splitters 64 and 70 respectively.

Preferably, detectors 80, 82, 86 and 88 are photosensitive transistors or equivalent detectors that are at least responsive to light of the wavelength generated by the laser diode source. Quarter wave plate 66 retards light having one polarization relative to light having an orthogonal polarization by one quarter wave. Light having its E-field polarized parallel to the axis of the quarter wave plate is delayed relative to light polarized orthogonal to the axis of the plate.

Figure 2:
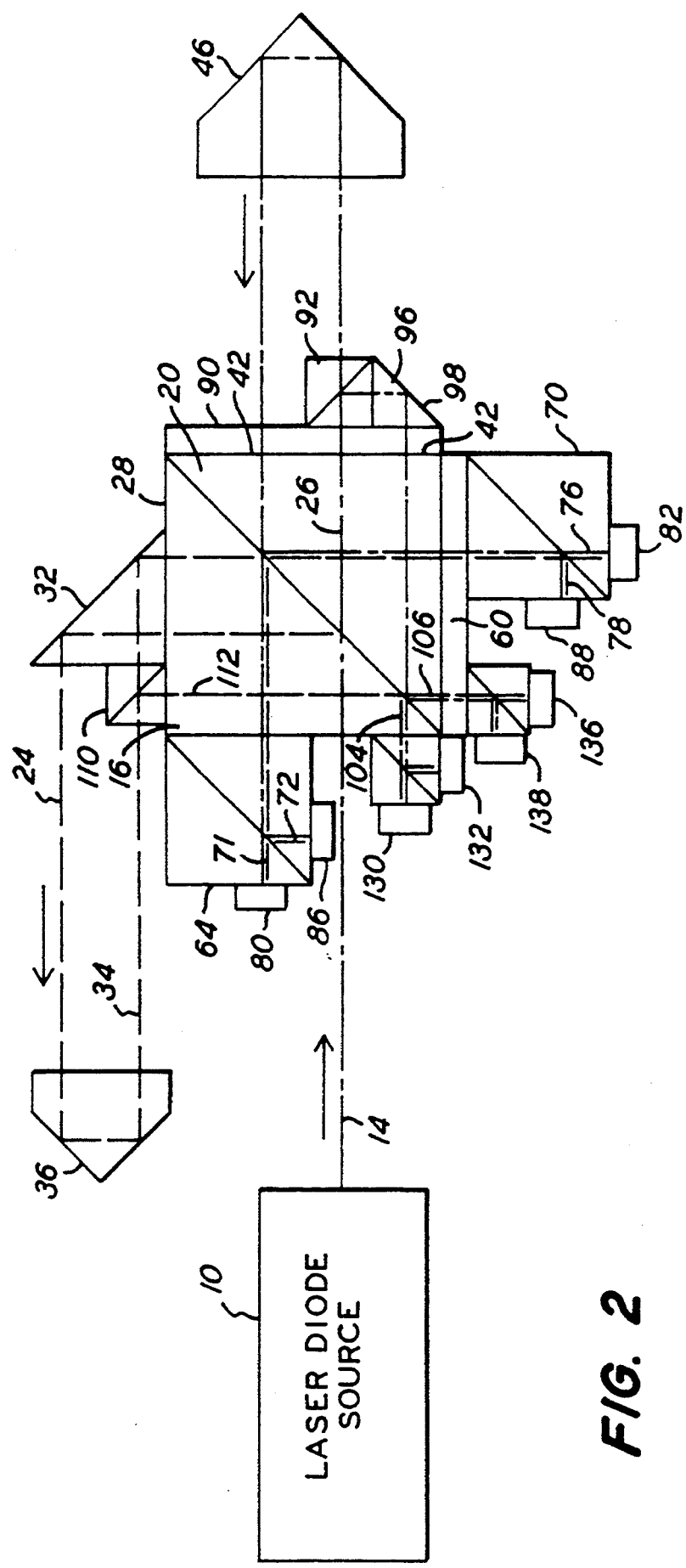
FIG. 2 is a diagrammatic view of a distance measuring interferometer in accordance with this invention, also including an internal calibration interferometer.

An embodiment of a distance measuring interferometer in accordance with this invention that incorporates a calibrating structure is shown in FIG. 2. In this and all the other figures, like elements are identified by like reference numerals, and except where indicated, the operation is substantially the same as described in connection with FIG. 1. In some cases, reference numerals are omitted from elements not specifically mentioned. Half wave plate 50 which in FIG. 1 was positioned so that the measurement beam 26 passes through the half wave plate only once, is replaced by a quarter wave plate 90 that is positioned on face 42 of the non-polarizing beam splitter 20, so that the measurement beam passes through the quarter wave plate twice, once on its way to measurement corner cube 46 and once on the way back. A portion of the outgoing measurement beam 26 is split by non-polarizing calibration beam splitter 92 and a measurement calibration beam 96 is reflected by reflector 98 through quarter wave plate 90 and surface 42 back into non-polarizing beam splitter 20. The measurement calibration beam 96 is combined with the reference calibration beam 112 to form an interfering calibration beam and is split by beam splitter 20 into interfering calibration output beams 104 and 106 respectively, which exit the non-polarizing beam splitter 20 through surfaces 16 and 60 respectively.

Similarly, returning reference beam 34 is split by non-polarizing calibration beam splitter 110 and a reference calibrating beam 112 re-enters non-polarizing beam splitter beam 20 through face 28. The reference calibration beam 112 is combined with measuring calibration beam 96 by the beam splitter 20 to form the interfering calibration beam which is split into first calibration output beam 104 directed out through surface 16, and the second calibration output beam 106 directed through output surface 60. First and second polarizing calibration beam splitters 120, 122 divide the interfering calibration beams 104 and 106 into P and S-polarized portions in a manner similar to the manner in which the polarizing beam splitters 64 and 70 act on the interfering measuring and reference beams.

The P-polarized portion of the calibration output beam 104 is sensed by detector 130 while the S-polarized portion is sensed by detector 132. Similarly, the P-polarized portion of calibration beam 106 is sensed by detector 136 and the S-polarized portion is sensed by detector 138.

Figure 3:
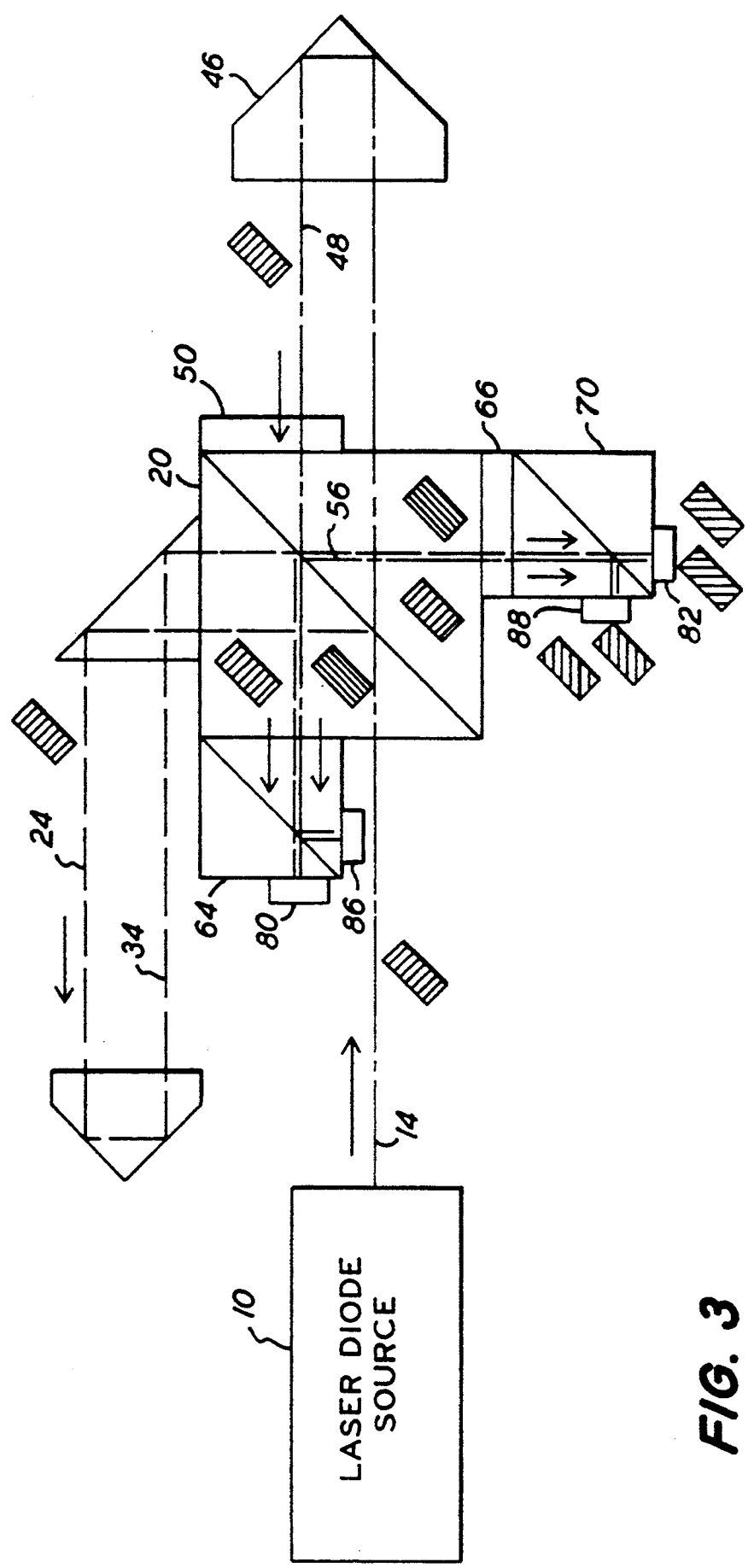
FIG. 3 is another view of the distance measuring interferometer of FIG. 1 with the polarization directions for the various light beams indicated schematically.

The distance measuring interferometer shown and described in connection with FIG. 1 is illustrated in FIG. 3, together with symbols representing the polarization of the various beams. The polarization symbols are small rectangles, intended to approximate the shape of the source beam 14 produced by the laser diode source 10. The lines represent direction of the E-field of the beam. For example, as shown by the symbol adjacent source beam 14, the E-field is perpendicular to the long beam axis, that is, the long direction of the rectangular beam cross-section, as the beam enters non-polarizing beam splitter 20. The non-polarizing beam splitter 20 does not change the polarization of the source beam, and accordingly the polarization of the returning reference beam 34 and the returning measurement beam 48, as they return to the non-polarizing beam splitter from the reference and measurement corner cubes respectively, are the same as for the source beam, that is with the E-field perpendicular to the long beam axis. The half wave plate 50 rotates the polarization of returning beam 48, so that the E-field is parallel to the long beam axis, as the measurement beam re-enters surface 42 of the non-polarizing beam splitter 20, and is recombined with the reference beam 34 to form an interfering beam and divided into interfering output beams 56 and 58. The output beam 56 passes through quarter-wave plate 66, and enters the polarizing beam splitter 70, where the P-polarized component is passed to detector 82, and the S-polarized component is passed to detector 88. Similarly, the interfering output beam 58 enters polarizing beam splitter 64, and the P-polarized portion is detected by detector 80, while the S-polarized portion is detected by detector 86.

When the elements of the distance measuring interferometer are accurately manufactured and properly assembled, such that the reference and measurement beams are nearly colinear, an interference pattern is produced at each of the detectors. The fringe spacing of the interference pattern depends in part upon how accurately the components interferometer are made. The interference pattern is a sinusoidally varying intensity distribution, which, upon observation, appears as a series of bright and dark parallel lines whose position depends upon the distance to the measurement corner cube. As the measurement corner cube 46 moves, the interference fringes scan across the detectors. It is preferred in accordance with this invention that the interferometer components be selected, manufactured, and assembled so that one fringe or less exists over the entire beam area. The detectors are small compared with the beam area, so that each detector samples only a small width, about one-fourth or less of the fringe spacing, of the interference pattern. As the measurement corner cube is displaced, the signal produced by each detector is a sine wave and the signals have equal periods. The phases of the sine wave signals produced by each of the detectors are 90° apart, as will be described below.

For convenience, we will consider the output of detector 82 to be at 0°. The output of detector 86 is shifted 90°, the output of detector 88 is shifted 180°, and the output of detector 80 is shifted 270°, in each case relative to the output of detector 82. The physical reason for these phase shifts may be understood by tracing the light paths as shown in FIG. 3. At the nominal 0° position, the length of the light path traversed by the reference beam 24 is the same as that traversed by the measurement beam 48. When the beams are recombined in the non-polarizing beam splitter 20, the measurement beam has passed through the half-wave plate 50, and the polarization has been rotated so that the E-field is aligned with the long axis of the beam cross-section. The interfering output beam 38 passes through quarter-wave plate 66, which adds additional optical path length so that the combined beams detected by detectors 82 and 88 are further delayed from the beams detected by detectors 80 and 86. The phase relationship between the two beams within each of the polarizing beam splitters 64 and 70 may be conceptually understood by considering the conservation of energy. When the reference and measurement beams recombine to form an interference pattern, a bright fringe leaving the beam splitter surface of polarizing beam splitter 64, to detector 80 for example, must be balanced by a dark fringe, leaving the splitter surface towards detector 86. In this way, no energy is created or destroyed at the beam splitter surface. Although this explanation does not include polarization effects, the result is the same when such effects are considered, and the conceptual basis is unnecessarily more complicated if polarization is considered.

The signals sensed by detectors 82 and 88 are 180° out of phase for the same reason. These signals are each shifted 90° with respect to the corresponding signals appearing at beam splitter 64, because of the presence of quarter-wave plate 66. The quarter wave plate affects the optical path length selectively between the S and P-polarizations when the quarter-wave plate axis is aligned with the P-polarization. This causes the fringes to shift by 90°, as would be the case if the reference corner cube were physically displaced by one-quarter wavelength.

Figure 4:
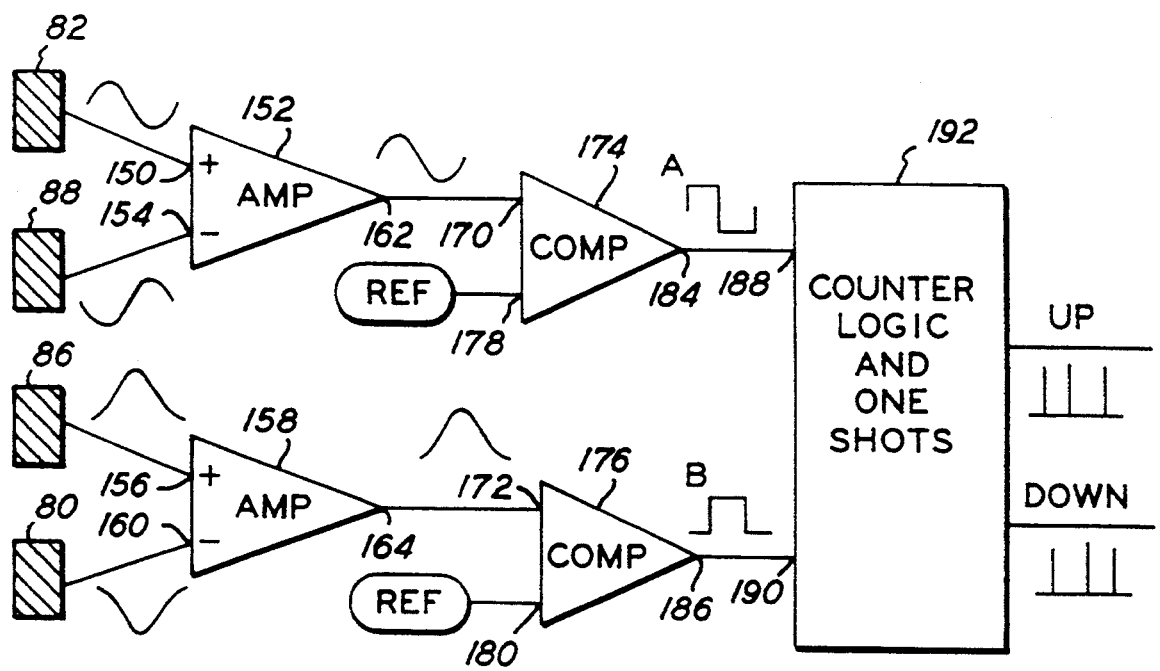
FIG. 4 is a block diagram of a circuit means for providing output signals from the distance measuring interferometer of FIG. 1.
Figure 6:
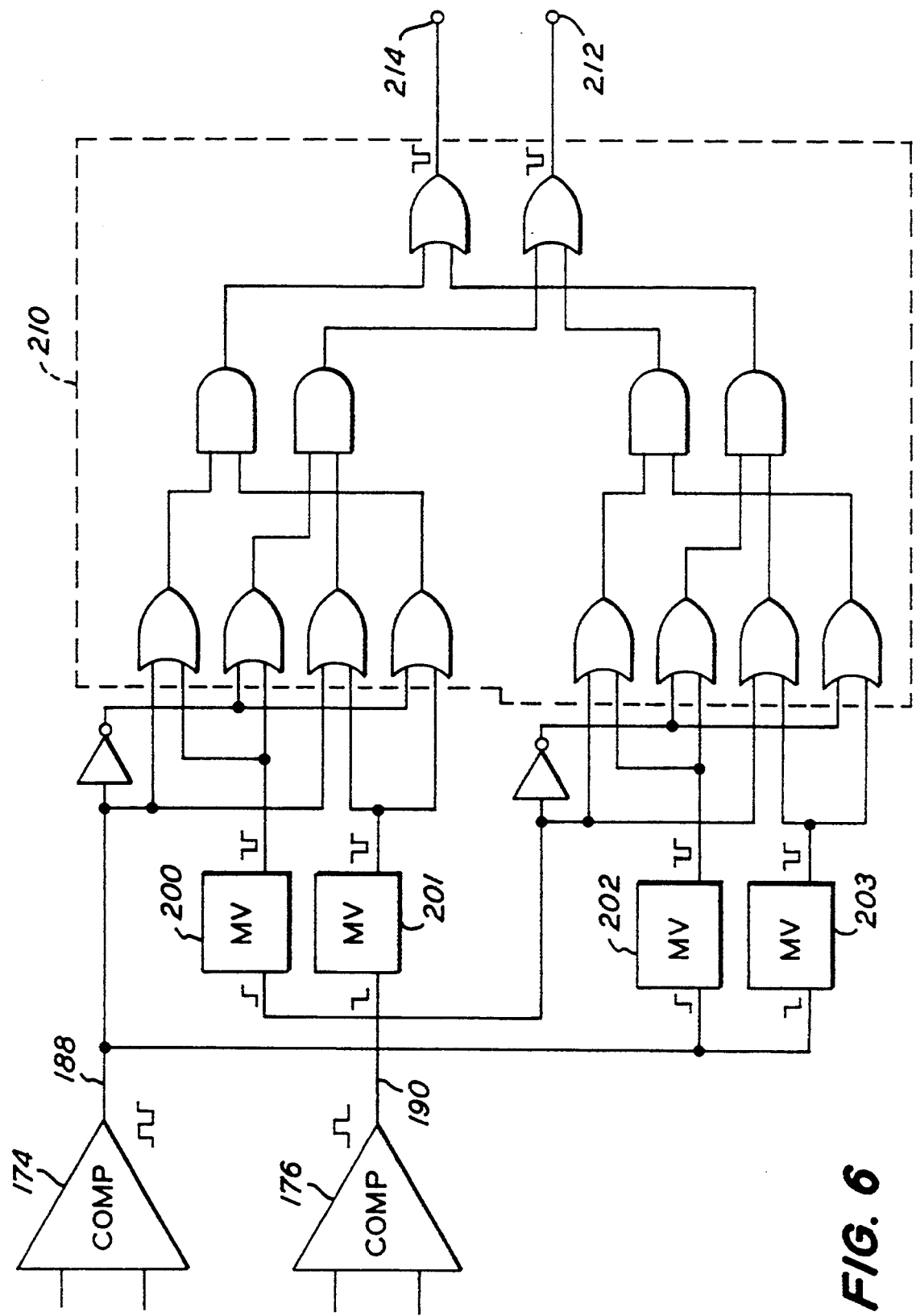
FIG. 6 is a simplified block diagram schematic of the counter-logic shown in FIGS. 4 and 5.

An exemplary signal processing and logic circuit for converting the signals appearing at the detectors into logic level up and down counter signals is shown in FIGS. 4 and 6. The sinusoidal outputs of detectors 82, 88, 86, and 80 represent the signals that are produced as the measurement corner reflector moves from its starting position. The sinusoidal output of detector 82 is applied to non-inverting input 150 of operational amplifier 152, while the output of detector 88 is applied to inverting input 154. In a similar fashion, the output of detector 86 is applied to non-inverting input 156 of operational amplifier 158, while the output of detector 80 is applied to inverting input 160 of amplifier 158. The outputs 162 and 164 of amplifiers 152 and 158 respectively are applied to first inputs 170 and 172 of comparators 174 and 176. Reference signals are applied to second inputs 178 and 180 of the two comparators, to produce square wave output signals at outputs 184 and 186 of the comparators as the measurement reflector moves. The outputs of the comparators are applied to inputs 188 and 190 of counter logic and one shot multi-vibrator circuit 192. A simplified schematic diagram of the counter logic is shown in FIG. 6. The counter logic operates as follows: the edges of the signal applied to input 188 are used by the counter logic to trigger a four one-shot multi-vibrator integrated circuits 200–203 that produce up/down pulses. The multi-vibrators 200–203 are triggered on the rising or falling edges of the outputs of comparators 174 and 176. Multi-vibrators 200 and 202 produce output pulses on the rising edges of the input signals, while multi-vibrators 201 and 203 produce output pulses on the trailing edges of the input pulses. The outputs of the multi-vibrators are combined with inverted outputs of the comparators 174 and 176 in logic circuit 210. When the signal applied to input 188 is rising while the signal applied to input 190 is low, or when the input applied to terminal 188 is falling, while the signal applied to signal 190 is high, a down count is generated at output. Conversely, if input 188 is rising while input 190 is high or if input 188 is falling while input 190 is low, an up count is generated at output 214. Four counts are generated per fringe.

The circuitry shown in FIGS. 4 and 6 provides a simple inexpensive up/down counter circuit that provides reasonable resolution. Greater resolution could be provided, for example, by converting the detector outputs to digital signals directly by analogue to digital converters. A four bit analogue to digital converter would produce 16 counts per fringe, thus providing greater resolution. Even greater resolutions can be obtained with 8, 12, or 16 bit A/D converters.

Figure 5:
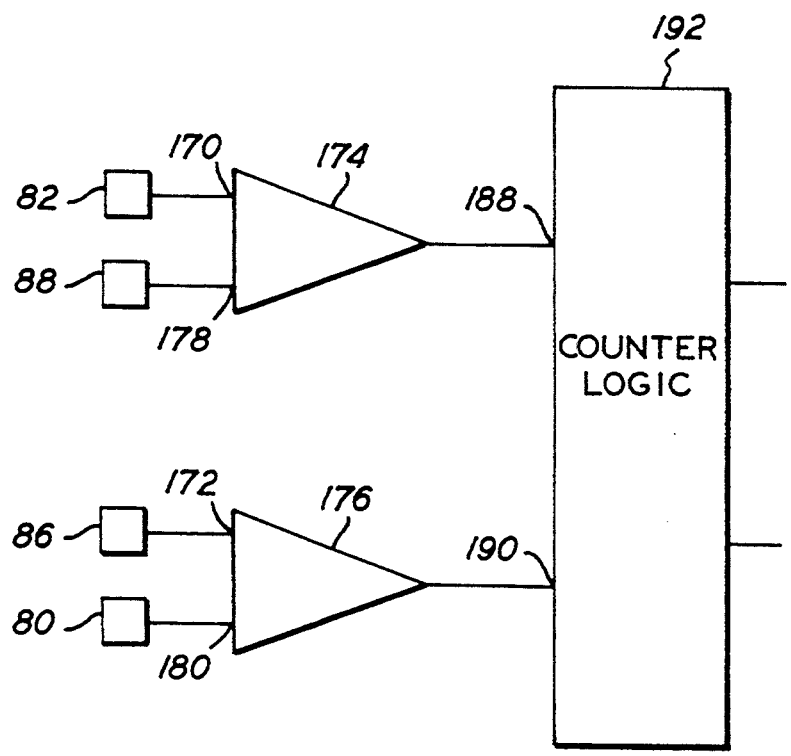
FIG. 5 is a simplified schematic diagram of alternative circuit means for providing output signals from the distance measuring interferometer of FIG. 1.

As a further alternative, the signal processing circuitry of this invention may be simplified by connecting the detectors 82, 88 directly to inputs 170, 178 of comparator 174, while at the same time connecting detectors 86, 80 respectively, directly to inputs 172, 180 of comparator 176. This arrangement is shown in a partial schematic diagram at FIG. 5, and is somewhat simpler and less expensive than the arrangement shown in FIG. 4, though it may be more susceptible to noise.

One limitation of the distance measuring interferometer shown and described in connection with FIG. 1 is related to the stability of available laser diode sources. Typically, the wavelength of a laser diode source varies as a function of temperature. Although such variations may occur slowly and not be particularly significant for short term measurements, and although the temperature may be stabilized by various well known means, such as housing the laser diode in a temperature controlled environment, the former is a significant limitation on the utility of a distance measuring interferometer in accordance with this invention, and the latter greatly increases the cost and size thereof. Other approaches for stabilizing laser diode wavelengths include the use of external cavities and the like, but these require complex control circuits and optics, and again significantly increase the cost of the distance measuring interferometer that incorporates them. The embodiment of the present invention shown in FIG. 2 provides a mechanically simple and relatively inexpensive way to stabilize the wavelength of a laser diode source, by providing a calibration signal derived from a calibration light path independent of the measured light path. The calibration signal varies as the wavelength of the laser diode source varies, and can be used in a simple feedback control circuit to stabilize the wavelength of the laser diode source, for example by modulating the injection current, or controlling the temperature of the laser diode. Modulating the injection current is presently preferred, because it offers substantially higher bandwidth, that is the ability to compensate for more rapid changes in laser diode wavelengths than does temperature control. Using any of these feedback control systems substantially eliminates the effects of temperature drift on the laser diode wavelength, and the only remaining results of temperature drift due to the thermal expansion or contraction of the beam splitter components, optical adhesives, and the mounting structure for the reference corner cube. These are well known and predictable and in addition are quite small, and may be either ignored or compensated for relatively easily.

With reference to FIG. 2, portions of both the returning reference beam 34 and the outgoing measurement beam 26 are split from the main beams by non-polarizing beam splitters 92 and 110 respectively, and directed to calibration detectors 136, 138, 132 and 130 that are attached to calibration polarizing beam splitters 120 and 122. A signal conditioning and logic circuit substantially identical to that shown in FIGS. 4 and 6 is attached to the calibration detectors, to produce up and down counting signals for the calibration beam. Because any changes in the signals produced by the calibration logic are not due to a change in position of the measurement corner cube, they must be due to either changes in the wavelength of the laser diode source, or changes in the optical elements of the distance measuring interferometer that will also affect the measurement beam. Accordingly, the output from the counter logic that are connected to the calibration detectors can be used as described above to either stabilize the laser diode source, or correct for errors arising from shifts in wavelength due to temperature.

Figure 7:
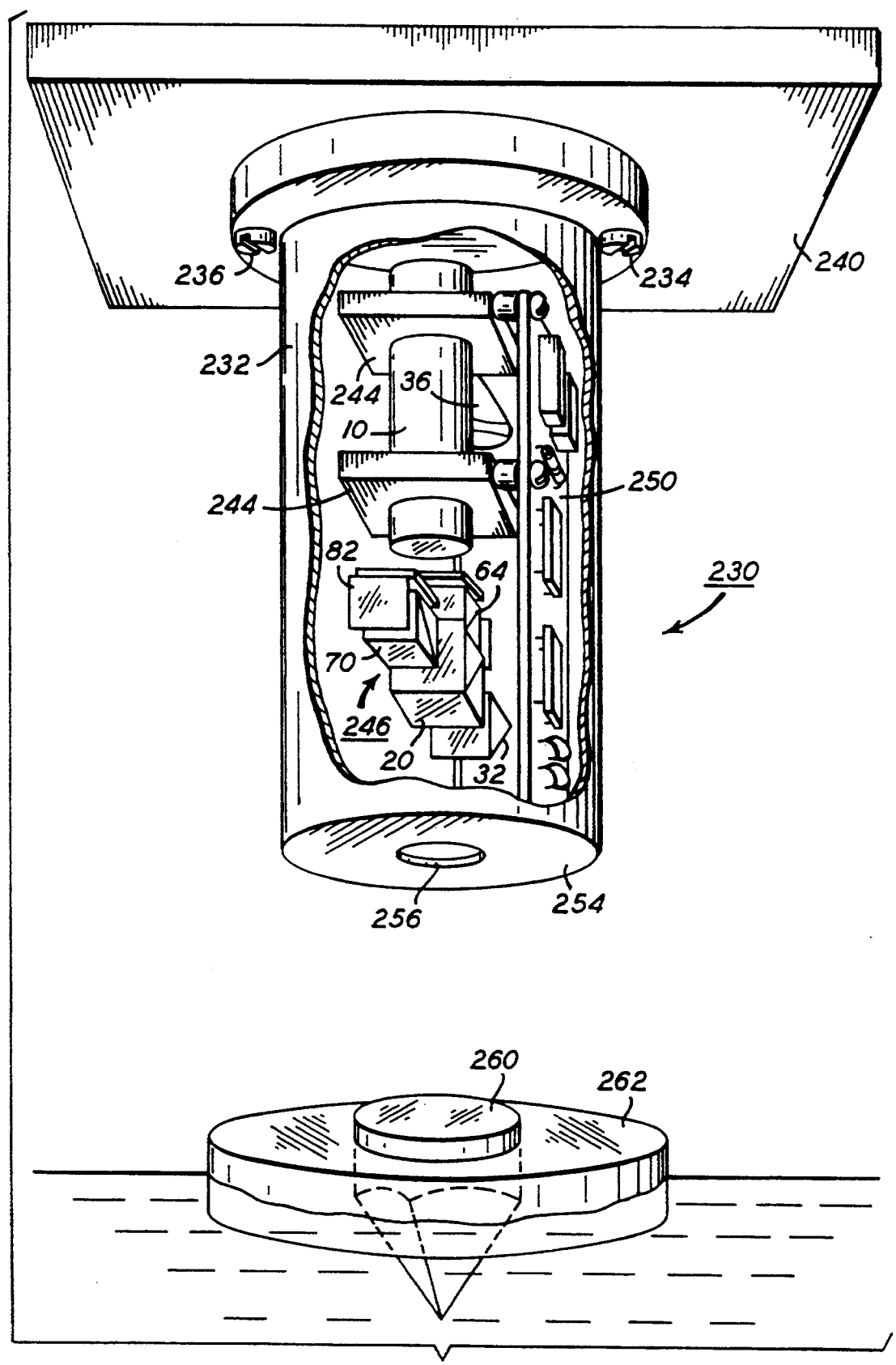
FIG. 7 is a perspective view of a distance measuring interferometer in accordance with this invention used in a liquid level sensing application.

The distance measuring interferometer of this invention is well suited to be implemented in a rugged compact package having a far greater range of utilities than the large bulky and sometimes delicate distance measuring interferometers of the prior art. FIG. 7 shows an exemplary embodiment of the distance measuring interferometer of this invention used in a liquid level sensing application. The distance measuring interferometer 230 is contained within a generally cylindrical housing 232 that is mounted by bolts 234 and 236 to a support 240 disposed over the liquid whose level it is desired to measure. The laser diode 10 is mounted by first and second generally rectangular supports 242 and 244 that are mounted on a base 246 disposed within housing 232. The optical elements of the distance measuring interferometer are shown in simplified form and are mounted on the base 246 with an adhesive or other known mechanical mounting technique. The non-polarizing beam splitter 20, the polarizing beam splitter 70, the prism 32, polarizing beam splitter 64, and reference corner cube 36 are all easily seen in FIG. 7, together with further components that are readily identifiable, but,which have not been numbered to avoid cluttering the drawing. The signal processing and logic circuit is constructed on a printed circuit board 250 that is preferably mounted on supports 242 and 244. Electrical connections to a utilization device have been omitted, but would be made in a conventional fashion. The housing 232 has an end plate 254 that includes an aperture 256 through which the outgoing and returning measurement beams pass, to aa measurement corner reflector 260, mounted on a floating platform 262, supported on the surface of the liquid whose height is to be measured. Depending upon the environment, the aperture 256 may be protected by a transparent window.

While the invention has been described in connection with several presently preferred embodiments thereof, those skilled in the art will recognize that many modifications and changes may be made therein, without departing from the true spirit and scope of the invention, which accordingly is intended to be defined solely by the appended claims.

What is claimed is:

1. An interferometer comprising:

source means for generating a source beam of linearly polarized coherent light along a light path;

non-polarizing beam splitting and combining and resplitting means, having first, second, third and fourth surfaces disposed in the path of the source beam for splitting the source beam entering along the surface into a reference beam exiting the second surface and a measuring beam exiting the third surface, and for recombining the reference and measuring beams into an interfering beam and splitting the interfering beam into a first output beam exiting through the first surface and a second output beam passing through the fourth surface;

reference reflector means positioned in the reference beam for causing the reference beam to traverse a reference path and return to the non-polarizing beam splitting means;

measuring reflector means spaced a distance to be measured from the non-polarizing beam splitting means for causing the measuring beam to traverse a measured path and return to the non-polarizing beam splitting means;

a half wave plate adjacent to one of the second and third surfaces of the non-polarizing beam splitting and combining and resplitting means and separated therefrom by an air gap for rotating the polarization of the measuring beam relative to the reference beam prior to recombining the measurement and reference beams in the non-polarizing beam splitting means;

first polarizing means positioned in the first output beam for selecting like polarized components of the first output beam;

second polarizing means in the second output beam for selecting like polarized components of the second output beam;

a quarter wave plate in one of the first output beam and the the second output beam attached to one of the fourth surface and the first surface for lengthening the optical path traversed by one polarization of the second output beam relative to the other polarization;

electrical circuit means including first and second detectors coupled to the first and second polarizing means respectively which detectors are responsive to the selected like polarized components of the first and second output beams respectively for providing first and second output signals proportional to the intensities of the combined like polarized components of the first and second output beams for determining changes in the length of the measurement path.

2. The interferometer of claim 1 in which the input beam and the first output beam each pass through the first surface and in which the first polarizing means comprises a first polarizing beam splitter adjacent to the first surface in the path of the first output beam.

3. The interferometer of claim 1 in which the quarter wave plate is attached to the fourth surface.

4. An interferometer comprising:
source means for generating a source beam of linearly polarized coherent light along a light path;

non-polarizing beam splitting and combining and resplitting means, first, second, third, and fourth surfaces disposed in the path of the source beam with the source beam passing through the first surface for splitting the source beam into a reference beam and a measuring beam and for recombining the reference and measuring beams into an interfering beam and splitting the interfering beam into a first output beam passing through the first surface and a second output beam passing through the fourth surface;

reference reflector means positioned in the reference beam for causing the reference beam to traverse a reference path and return to the non-polarizing beam splitting means;

measuring reflector means spaced a distance to be measured from the non-polarizing beam splitting means for causing the measuring beam to traverse a measured path and return to the non-polarizing beam splitting means:

a half wave plate adjacent to the non-polarizing beam splitting and combining the resplitting meand and spaced apart from the third surface by an air gap in one of the reference and measuring beams for rotating the polarization of the measuring beam relative to the reference beam prior to recombining the measurement and reference beams in the non-polarizing beam splitting means;

a first polarizing beam splitter adjacent to the first surface in the past of the first output beam for selecting like polarized components of the first output beam;

a quarter wave plate attached to the fourth surface in the past of the second output beam for lengthening the optical path traversed by one polarization of the second output beam relative to the other polarization;

a second polarizing beam splitter in the path of the second output beam following the delay means for selecting like polarized components of the second output beam;

electrical circuit means including first and second detectors coupled to the first and second polarizing means respectively which detectors are responsive to the selected like polarized components of the first and second output beams respectively for providing first and second output signals proportional to the intensifies of the combined like polarized components of the first and second output beams for determining changes in the length of the measurement path.

5. The interferometer of claim 4 in which the second polarizing beam splitter is attached to the fourth surface.

6. The interferometer of claim 4 in which the second polarizing beam splitter is attached to the quarter wave plate.

7. The interferometer of claim 1 in which the reference reflector means comprises a first retroreflector.

8. The interferometer of claim 1 in which the measuring reflector means comprises a second retroreflector.

9. The interferometer of claim 1 in which the first and second detectors comprise first and second photosensitive detectors coupled to the first and second polarizing beam splitters respectively.

10. The interferometer of claim 9 in which the first, second, third, and fourth detectors comprise photosensitive diodes.

11. The interferometer of claim 1, wherein the first and second polarizing means also select further like polarized components of the first and second output beams shifted 180 degrees from the selected like polarized components of the first and second output beams, and further comprising third and fourth detectors responsive to the further like polarized components.

12. The interferometer of claim 1 in which the source means comprises a laser diode.

13. The interferometer of claim 1 further comprising a reflector attached to the non-polarizing beam splitting and combining and resplitting means for directing the reference beam towards the reference reflector means, in a direction parallel to the source beam and the measuring beam for providing a compact linear interferometer.

14. The interferometer of claim 5, comprising a spacer disposed between the half wave plate and the non-polarizing beam splitting and combining and resplitting means for compensating for any wedge in the half wave plate.

15. The interferometer of claim 12, in which the laser diode source, non-polarizing beam splitting and combining and resplitting means, the first and second polarizing means, and the reference corner cube are mounted in a single housing having an end face through which the measuring beam passes.

16. The interferometer of claim 1, in which the electrical circuit means comprises reference means and comparator means connected to the reference means and responsive to the first and second output signals for providing first and second counter signals; and counter means responsive to the first and second counter signals for producing up pulses when the distance to be measured is increasing, and down pulses when the distance to be measured is decreasing.

17. The interferometer of claim 12, in which the electrical circuit means comprises combining means for combining the outputs of the first and third detectors, and second combining means for combining the outputs of the second and fourth detectors;

first and second reference means;

first and second comparator means connected to the first combining means and first reference means, and to the second combining means and second reference means respectively for producing first and second counting signals; and counter means responsive to the first and second counting signals for generating up pulses when the measuring reflector is moving away from the interferometer and down pulses when the measuring reflector is moving toward the interferometer.

18. An interferometer comprising:

source means for generating a source beam of linearly polarized coherent light along a light path;

non-polarizing beam splitting and combining and resplitting means disposed in the path of the source beam for splitting the source beam into a reference beam and a measuring beam and for recombining the reference and measuring beams into an interfering beam and splitting the interfering beam into a first output beam and a second output beam:

reference reflector means positioned in the reference beam for causing the reference beam to traverse a reference path and return to the non-polarizing beam splitting means;

measuring reflector means spaced a distance to be measured from the non-polarizing beam splitting means for causing the measuring beam to traverse a measured path and return to the non-polarizing beam splitting means;

means in one of the reference and measuring beams for rotating the polarization of the measuring beam relative to the reference beam prior to recombining the measurement and reference beams in the non-polarizing beam splitting means:

first polarizing means positioned in the first output beam for selecting like polarized components of the first output beam;

delay means in the second output beam for lengthening the optical path traversed by one polarization of the second output beam relative to the other polarization;

second polarizing means in the second output beam following the delay means for selecting like polarized components of the second output beam;

means for directing a calibrating portion of the measuring beam along a calibration path of fixed length;

means for combining and interfering the calibration portion of the measuring beam with a calibrating portion of the reference beam for generating an interfering calibration beam; and means for detecting changes in the interfering calibration beam due to changes in the wavelength of the laser diode source for controlling the wavelength of the laser diode source; and electrical circuit means including first and second detectors coupled to the first and second polarizing means respectively which detectors are responsive to the selected like polarized components of the first and second output beams respectively for providing first and second output signals proportional to the intensities of the combined like polarized components of the first and second output beams for determining changes in the length of the measurement path.

19. The interferometer of claim 18, in which the means for directing a calibration portion of the measuring beam along a calibration path of fixed length comprises second non-polarizing beam splitting means disposed in the measurement beam prior to the measuring reflector means.

20. The interferometer of claim 19 further comprising first calibrating polarizing beam splitter means for selecting like polarized portions of the interfering calibration beam.

21. The interferometer of claim 20 comprising second non-polarizing calibration beam splitter means disposed in the reference beam;

means for splitting the interfering calibration beam into first and second calibration output beams;

calibration delay means disposed in the second calibration output beam for lengthening the optical path traversed by one of the polarizations of the second calibration output beam relative to the other polarization;

first polarization means in the first calibration output beam for selecting like polarized components of the first calibration output beam;

second polarizing means in the second calibration output beam following the calibration delay means for selecting like polarized components of the second calibration output beam;

wherein the means for detecting changes in the interfering calibration beam due to changes in the wavelength of the diode source comprises first and second detector means responsive to the like polarized components of the first and second calibration beams produced by the first and second calibration means.

22. The interferometer of claim 18, in which the electrical circuit means comprises comparator means connected to the first and second detectors and responsive to the first and second output signals for providing a series of generally square wave pulses in response to the passage of interference fringes across the detectors, as the measuring reflector is displaced; and counter and logic means responsive to the leading and trailing edges of the square wave pulses for producing output up pulses when the distance to the measuring reflector is increasing and output down pulses when the distance to the measuring reflector is decreasing.

23. The interferometer of claim 22 in which the electrical circuit means further comprises one shot multivibrator means coupled to the outputs of the comparator means for generating pulses in response to the leading and trailing edges of the generally square wave pulses produced by the comparator means.

24. A compact integrated distance measuring interferometer comprising:

a unitary interferometer housing including a housing end wall having an aperture therein; laser diode source means for generating a polarized light beam along a first light path parallel to an elongated axis of the housing;

interferometer means in the light path for splitting the source beam into a reference beam and a measuring beam, the measuring beam aligned with and exiting through the aperture, and for reflecting the reference beam reflected along an axis within the housing and parallel to and spaced apart from the first optical axis;

reference reflector means within the housing and fixed relative to the source means and interferometer means for causing the reference beam to travel along a light path completely within the housing and return to the interferometer means; and the interferometer being operative to project the measurement beam through the aperture to a reflector and to receive a returning measurement beam through the aperture and recombine the returning measurement beam with the reference beam within the housing, and also comprising detector means coupled to the interferometer means and electrical circuit means connected to the detector means; the detector means being responsive to the recombined beam for generating output signals proportional to the change in length of the path traversed by the measurement beam.

25. A distance measuring interferometer comprising;
laser diode source means for generating a polarized source beam characterized by a temperature dependent wavelength and including injection current generating means;
means for causing a reference portion of the source beam to traverse a reference path and for causing a measurement portion of the source beam to traverse a measurement path;
means for changing the relative polarization of light beams in the reference and measuring paths;
means for recombining the reference and measuring beams to provide first and second interfering beams;
adjusting means for setting the difference in the optical path lengths of the reference and measurement paths to zero; and
control means coupled to the injection current generating means and responsive to the first and second interfering beams for for varying the injection current to compensate for changes in the wavelength of the laser diode source.

26. A distance measuring interferometer comprising laser diode source means for generating a polarized source beam characterized by a temperature dependent wavelength;
means for causing a reference portion of the source beam to traverse a reference path and for causing a measurement portion of the source beam to traverse a measurement path;
means for changing the relative polarization of light beams in the reference and measuring paths;
means for recombining the reference and measuring beams to provide first and second interfering beams;

adjusting means for setting the difference in the optical path lengths of the reference and measurement paths to zero; and
control means coupled to the laser diode means and responsive to the first and second interfering beams for controlling the source means to compensate for changes in the wavelength of the laser diode source; and
temperature control means for controlling the temperature of the laser diode source; and in which the control means is coupled to the temperature control means for changing the temperature of the laser diode source in response to changes in the first and second interfering beams.

27. A distance measuring interferometer comprising:
a laser diode source for generating a coherent source beam having a temperature dependent wavelength that may vary during a measurement;
means for splitting the source beam into a measurement beam and a reference beam;
means for directing the reference beam along a reference path of fixed length;
means for directing the measurement beam along a measurement path of changeable length;
means for recombining and interfering the measuring beam and the reference beam;
means responsive to the recombined interfering beam for measuring changes in the length of the measuring path;
means for directing a calibration portion of the measuring beam along a calibration path of fixed length;
splitter means for producing a calibration portion of the reference beam;
means for recombining and interfering the calibration portion of the measuring beam with a portion of the reference beam for generating a interfering calibration beam; and
sensor means for detecting changes in the interfering calibration beam due to changes in the wavelength of the laser diode source; and
control means coupled to the sensor means and the laser diode means for controlling the wavelength of the laser diode source.

28. The distance measuring interferometer of claim 27, in which the laser diode source comprises means for generating a polarized source beam, and further comprising means for shifting the polarization of the reference beam relative to the measuring beam.

* * * * *